UNITED STATES PATENT OFFICE.

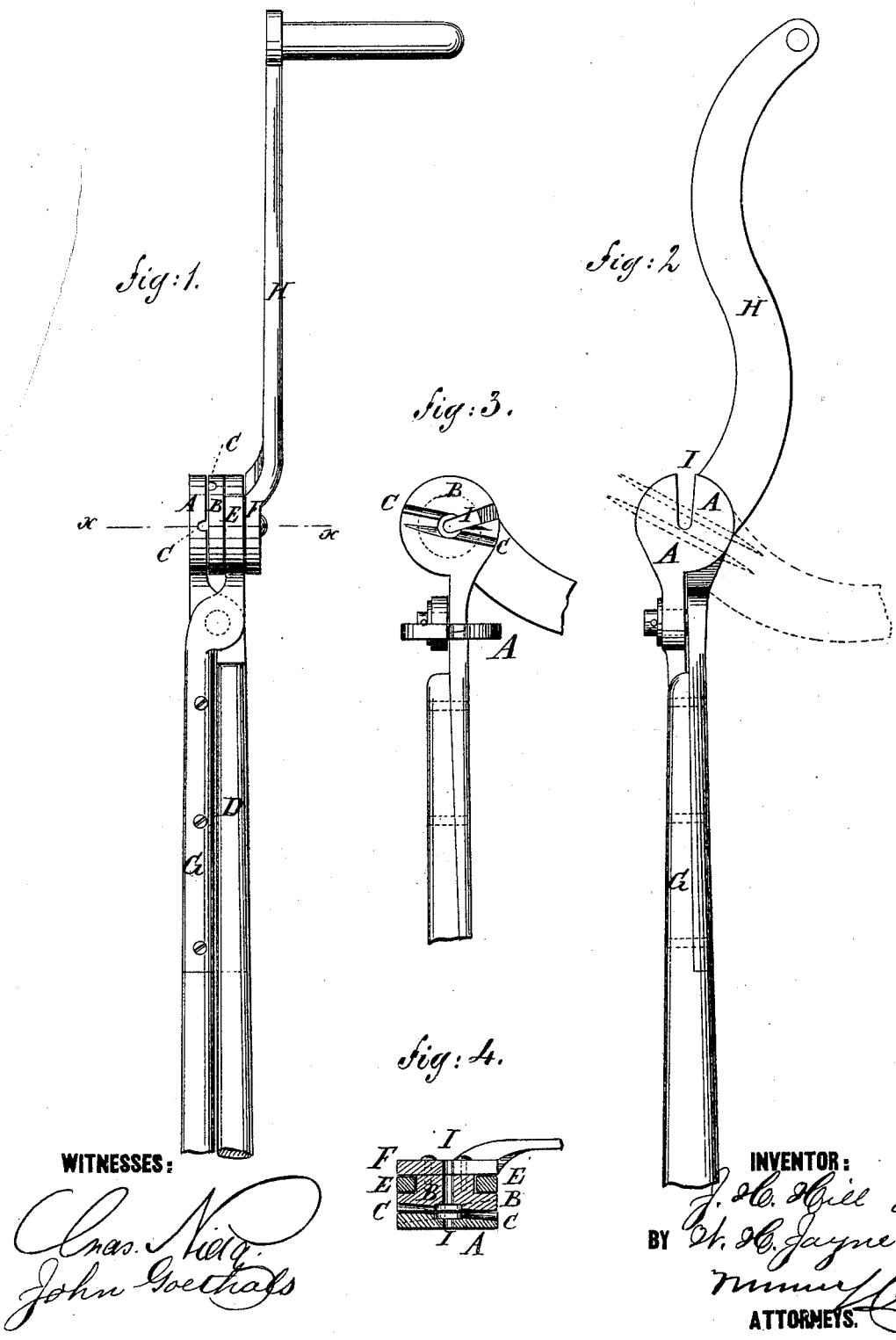

WILLIAM H. JAYNE AND JAMES H. HILL, OF BOONE, IOWA.

IMPROVEMENT IN FENCE-BARB FORMERS.

Specification forming part of Letters Patent No. 176,121, dated April 11, 1876; application filed January 29, 1876.

*To all whom it may concern:*

Be it known that we, WILLIAM H. JAYNE and JAMES H. HILL, of Boone, Boone county, Iowa, have invented a new and useful Improvement in Fence-Barb Former, of which the following is a specification:

Figure 1 is a top view of our improved barb-former. Fig. 2 is a side view of the same. Fig. 3 is a side view of the same opened to show the grooved face of one of the disks. Fig. 4 is a detail section of the same, taken through line $x\ x$, Fig. 1.

Similar letters of reference indicate corresponding parts.

The object of this invention is to improve the construction of the barb-former for which Letters Patent No. 172,437 were granted to us January 18, 1876, to make it more convenient in use.

The invention consists in an improved barb-former of the four disks and the three handles, connected together and operating as hereinafter fully described.

A B are two disks, in the adjacent faces of which are formed two grooves, C, upon the opposite sides of and close to their centers. The grooves C in each face are made alternately deeper at one end and shallower at the other, so that the parts of the wires of which the barb is to be formed, upon the opposite sides of their centers, may be embedded in the opposite faces of the said disks, as shown in Figs. 1, 3, and 4. Upon the edge of the disk A is formed a stem, to which is attached a handle, D, and upon the outer side of the disk B is formed a stud, which passes through and works in a hole in a third disk, E, and to its end is attached a fourth disk, F. The stud of the disk B is made so large that the screws that secure the disk F to its end may be upon the opposite sides of its center, as shown in Fig. 4. Upon the edge of the disk E is formed a stem, to which is attached a handle, G. The stems of the two disks A E are pivoted to each other, so that the disk A may be forced away from the disk B, to release the formed barb, by moving the handles D G from each other, and so that the two disks may be pressed together, while forming the barb, by pressing the said handles together. Upon the edge of the disk F is formed a stem, to which is attached, or upon which is formed, a handle, H. We prefer to make the handle H in the form of a crank, for convenience in operating it. In the four disks A B E F are formed radial slots I, leading from the edge to the center, at an angle with the grooves C, and in such positions that when the handle H is turned into the position shown in Figs. 1, 2, and 4, the four slots will be in line with each other, as shown in Figs. 2 and 4.

In using the instrument the handle H is turned into the position shown in Figs. 1, 2, and 4, and is placed on the fence-wire. The handle H is then turned back into the position shown in dotted lines in Fig. 2, and in full lines in Fig. 3, locking the instrument upon the fence-wire, and bringing the grooves C of the disks A B into line with each other. Two short wires are then inserted in the holes formed by the grooves C, as indicated by the dotted lines in Fig. 2, and the handle H is turned forward, which twists the said wires around each other and around the fence-wire, forming a four-pointed barb, and securing it firmly to said fence-wire. The handles D G are then spread apart to release the barb, the handle H is turned to bring the slots I in line with each other, and the instrument is removed from the fence-wire, and is ready to be used for forming another barb.

If desired, the barbs may be formed of U-shaped wires or staples; but in this case the staples must be applied to the fence-wires in such a way that their bends may be upon the opposite side of said fence-wire, and that the bend of each may be between the arms of the other. The instrument is then applied in the manner hereinbefore described.

Having thus described our invention, we claim as new and desire to secure by Letters Patent—

An improved barb-former, formed of the four-grooved disks A B E F and the three handles D G H, constructed, connected together, and operating substantially as herein shown and described.

W. H. JAYNE.
JAMES H. HILL.

Witnesses:
AL. S. BEAN,
WM. ROBINSON.